(12) United States Patent
Csabi et al.

(10) Patent No.: US 12,294,862 B1
(45) Date of Patent: May 6, 2025

(54) FRAUDULENT CALL MONITORING

(71) Applicant: United Services Automobile Association (USAA), San Antonio, TX (US)

(72) Inventors: Rachel Elizabeth Csabi, Frisco, TX (US); Hollie Ilene King, Frisco, TX (US); Victor Kwak, Frisco, TX (US); Zachery C. Lake, Aubrey, TX (US); Yogen Rai, Plano, TX (US); Samantha Elizabeth Taylor, Frisco, TX (US); Nicholas C. Wheeler, The Colony, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 297 days.

(21) Appl. No.: 17/085,453

(22) Filed: Oct. 30, 2020

Related U.S. Application Data

(60) Provisional application No. 62/929,314, filed on Nov. 1, 2019.

(51) Int. Cl.
*H04W 12/122* (2021.01)
*G06F 40/279* (2020.01)
*G06N 20/00* (2019.01)

(52) U.S. Cl.
CPC ........ *H04W 12/122* (2021.01); *G06F 40/279* (2020.01); *G06N 20/00* (2019.01)

(58) Field of Classification Search
CPC ........ G06F 21/44; G06F 21/88; G06F 40/279; G06F 726/023; H04L 63/0245;
(Continued)

(56) References Cited

U.S. PATENT DOCUMENTS

| 8,145,562 B2 * | 3/2012 | Wasserblat ............. G06Q 40/02 705/38 |
| 10,609,072 B1 * | 3/2020 | Weldon ................... H04L 67/02 |

(Continued)

FOREIGN PATENT DOCUMENTS

WO    WO-2005064854 A1 *  7/2005  ......... H04L 12/2854

*Primary Examiner* — Luu T Pham
*Assistant Examiner* — Paul J Skwierawski
(74) *Attorney, Agent, or Firm* — Fletcher Yoder, P.C.

(57) ABSTRACT

A fraud detection system includes a source communication device associated with a source and a client device associated with a client to identify fraudulent calls to provide mitigating or remedial actions. The client device includes a memory that stores instructions and a processor that executes the instructions. The instructions cause the client device to monitor a wireless communication between the client device and the source communication device to identify a keyword, a combination of keywords, a context, and/or a topic of the wireless communication. Moreover, the instructions cause the client device to identify fraudulent detection characteristics of the wireless communication based at least in part of the keyword, the combination of keywords, the context, and/or the topic, identify the wireless communication as fraudulent communication based on the fraudulent detection characteristics, and identify and implement a remedial action based at least in part on a threshold of the wireless communication.

17 Claims, 4 Drawing Sheets

(58) Field of Classification Search
CPC ... H04L 63/0263; H04L 63/12; H04L 63/126; H04L 63/14; H04L 63/1483; H04L 63/30; H04W 12/12; H04W 12/60; H04W 12/67; H04W 12/122; G06N 20/00
See application file for complete search history.

(56) References Cited

U.S. PATENT DOCUMENTS

| | | | |
|---|---|---|---|
| 10,616,411 B1* | 4/2020 | Chang | H04M 3/2281 |
| 11,010,468 B1* | 5/2021 | Katz | G06F 21/577 |
| 2006/0021031 A1* | 1/2006 | Leahy | H04L 67/02 |
| | | | 726/22 |
| 2010/0017615 A1* | 1/2010 | Boesgaard Sorensen | |
| | | | G06F 21/554 |
| | | | 713/176 |
| 2018/0033009 A1* | 2/2018 | Goldman | G06Q 40/10 |
| 2018/0295238 A1* | 10/2018 | Hardy | G06F 21/316 |

* cited by examiner

FRAUDULENT CALL MONITORING

CROSS-REFERENCE TO RELATED APPLICATIONS

This application claims priority to and the benefit of U.S. Provisional Application No. 62/929,314, filed Nov. 1, 2019, and entitled, "FRAUDULENT CALL MONITORING," which is incorporated herein by reference in its entirety for all purposes.

BACKGROUND

The present disclosure relates generally to fraud detection. More specifically, the present disclosure relates to identifying fraudulent calls to provide mitigating or remedial actions.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

With the growing trend of using wireless devices for daily activities, such that most wireless device users keep their wireless devices with them, fraud schemes have been updated to target users via wireless communications. In particular, since the devices may be used for daily tasks, such as making calls, performing online banking transactions, sending texts, checking emails, and so forth, fraud schemes have been updated to target devices with fraudulent calls, texts, and/or emails. In telecommunication fraud, a fraudulent number may call the device and attempt to gain identification information from the user, such as a social security number or a bank account number. The user may provide the requested identification information without realizing or prior to realizing that the call is from a fraudulent source. However, calls, texts, and/or emails may be also be from a trusted source since the device may be regularly used for daily activities. As such, discerning a fraudulent communication from a legitimate communication in a timely manner may be difficult.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
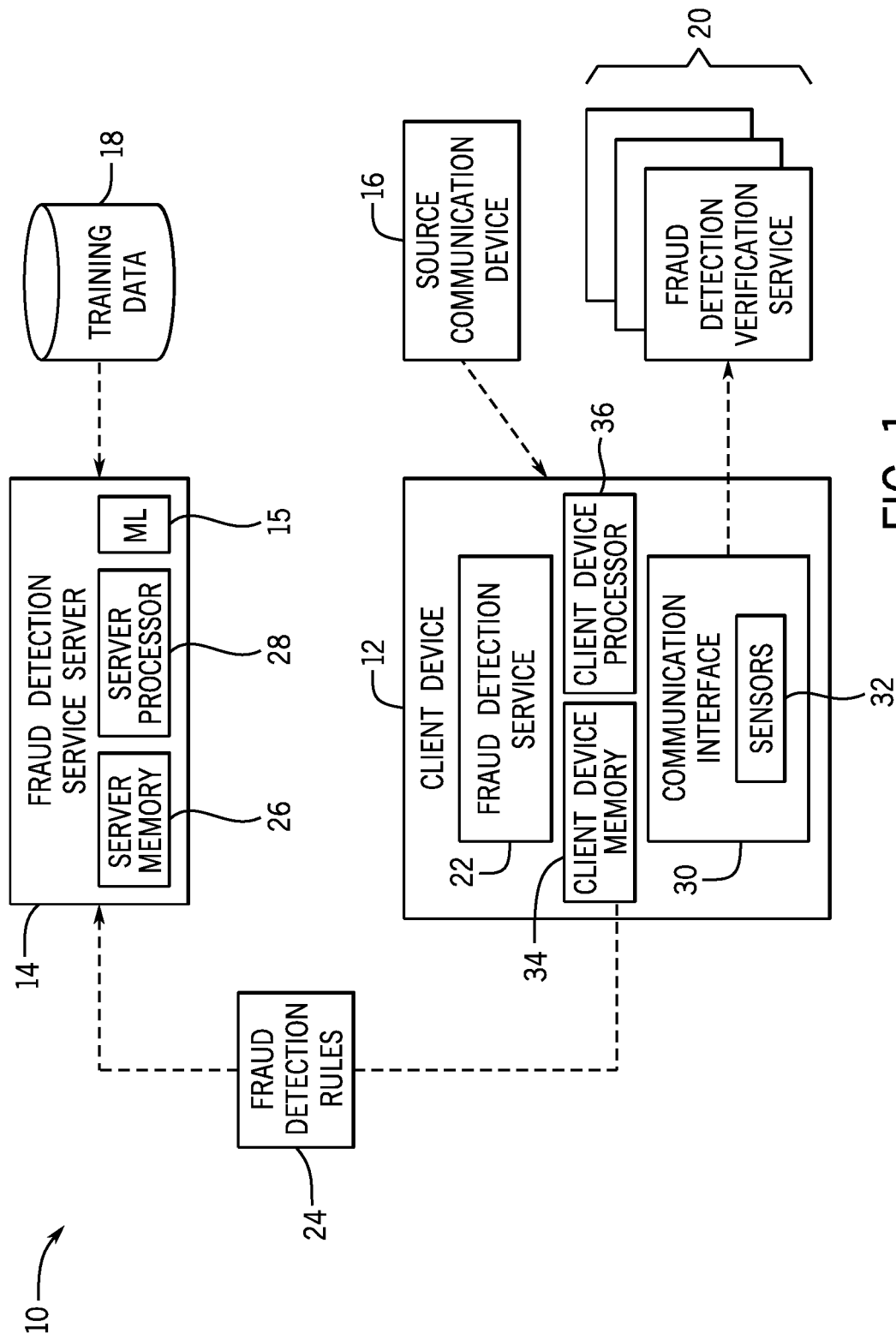
FIG. 1 illustrates a block diagram of a fraud detection system, in accordance with embodiments described herein.

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, a wireless device user may be susceptible to fraudulent wireless communication. Since the wireless device may be used for texting, calling, performing online transactions, and/or sending emails, fraud schemes may target such activities. By way of example, a fraudulent credit card call may target the user and claim that a particular credit card account associated with the user is under review for card activity. Since the user may use credit cards on a daily basis, the user may be likely to stay connected to the call to answer account related questions, relaying sensitive account information to the fraudulent call representative.

In some instances, wireless network providers and/or the user may attempt to block a phone number from a known fraudulent source. However, fraudulent telecommunication services often use "spoofing" techniques in which the phone number for the fraudulent source is indicated to be from a trusted source. For example, the wireless device receiving a fraudulent phone call may indicate that an identification (I.D.) for the phone call is from a local area code, a government agency, or another likely trusted source. As such, if the wireless network provider and/or the user attempts to block the phone number after determining that it's associated with a fraudulent source, the phone number may be "spoofed" again to indicate another number with the local area code, another identification associated with the known government agency, and so forth. Thus, blocking the phone number associated with the fraudulent source each time the communication occurs may be difficult.

Accordingly, it is now appreciated that there is a need to efficiently and accurately determine whether a wireless communication is legitimate or fraudulent to mitigate or prevent the user from providing sensitive information to the fraudulent source. However, determining characteristics indicating the wireless communication to be fraudulent may be difficult to implement in practice.

With the foregoing in mind, FIG. 1 illustrates a block diagram of fraud detection system 10. As shown, the fraud detection system 10 may include a client device 12, a fraud detection service server 14, a source communication device 16, a training data set 18, and a fraud detection verification service 20. The client device 12 may include a wireless phone, a tablet, a laptop, and the like, that is capable of receiving and transmitting wireless signals over a wireless network. Similarly, the source communication device 16, which may be a device used by a fraudulent source, may include a wireless phone, a tablet, a laptop, and the like. In some embodiments, the source communication device 16 may also include a voice over internet protocol (VOIP), in which a user's voice is converted into a digital signal and transmitted over a wireless network (e.g., an internet connection) rather than an analog phone line.

Although the following descriptions discuss the client device 12 and the source communication device 16 communicating using a telecommunication service, which represents a particular embodiment, it should be noted that the methods and systems described herein may also be performed and implemented with other forms of communication, such as text, email, online chat, dialog box on a browser, and so forth.

The client device 12 may also include a fraud detection service 22, which may be an application or program executing on the client device 12 that is used to monitor a wireless communication between the client device 12 and the source communication device 16. To facilitate accurate and precise fraud detection, the fraud detection service 22 may access user activity information and/or third party information related to the wireless communication (e.g., phone call made by the source communication device 16 to the client device 12) to verify information discussed during the wireless communication. To retrieve accurate user activity information, the fraud detection service 22 may be enabled (e.g., as a default and/or by user permission) to communicate with other applications and/or services on the client device 12. Although the following descriptions discuss the fraud detection service 22 as communicating with a single particular application and/or a single particular service, which represents a particular embodiment, it should be appreciated that the methods and systems provided herein may also include the fraud detection service 22 as communicating with a greater number (e.g., two, four, and fifteen) applications and/or services of the fraud detection verification services 20.

The fraud detection service 22 may communicate with the fraud detection verification services 20 that include the applications and/or services executing at an interface (e.g., graphical user interface (GUI) of the client device 12) or in the background (e.g., not on the interface). That is, the fraud detection service 22 may retrieve data associated with each of the enabled applications and/or services of the fraud detection verification services 20 to determine whether the wireless communication may be verified (e.g., from a trusted or known source). Since the client device 12 may be used for various daily activities, accessing user activity information directly from the client device 12 may be an effective verification method. By way of example, the client device 12 may be logged into or have cached login credentials for a particular application on the client device 12 that the fraud detection service 22 may access. Thus, if the context of the wireless communication relates to the particular application, the fraud detection service 22 may access and verify the information directly from the particular application.

In some embodiments, the fraud detection verification services 20 may also include third party data that is not directly associated with the user activity on the client device 12. That is, the fraud detection verification services 20 may include application and/or service information that may not be directly stored (e.g., is external) from the client device 12. Instead, the information may be accessible through the network and/or stored on a database that is accessible by the client device 12. By way of example, the third party data may include policy information associated with the particular application that indicates the user's activity. The policy information may indicate the expected communication from an enterprise representative associated with the particular application. For example, the expected communication may include, but is not limited to, preferred means of communication (e.g., user will receive a text prior to a call from the enterprise representative), time frame in which the enterprise representative may contact the user, and/or specific credentials verified when the enterprise representative contacts the user. As such, the fraud detection service 22 may use user activity data for the particular application and/or service on the client device 12 and/or third party data associated with the particular application and/or service.

In some embodiments, the client device 12 may be communicatively coupled to and/or include a communication interface 30 that may enable communication with any suitable communication network, such as wiring terminals, a cellular network, a Wi-Fi network, a personal area network (PAN), a local area network (LAN), a wide area network (WAN), and/or the like. For example, the communication interface 30 may enable the client device 12 to communicate with the fraud detection service server 14, the fraud detection verification services 20, and/or the source communication device 16. In some embodiments, the communication interface 30 may also include one or more sensors 32, which may include an audio sensor and/or a display sensor (e.g., screen detector). The audio sensor (e.g., microphone) may detect and/or record the audio communication of the wireless communication (e.g., conversation). The display detector may detect a display on the client device 12, for example, to detect text, words, and/or images when the wireless communication includes such graphics. The client device 12 may communicate the audio and/or display data to the fraud detection service server 14 to determine one or more keywords and/or the context of the wireless communication. For example, the context of the wireless communication may be based on the one or more keywords or combination of keywords.

As shown, the fraud detection service 22 of the client device 12 may be communicatively coupled to the fraud detection service server 14, which includes a machine learning algorithm 15, a server memory 26, and/or a server processor 28. In some embodiments, the fraud detection service server 14 may be integrated with the client device 12, such that the determinations performed by the fraud detection service server 14 are performed by the client device 12.

The fraud detection service server 14 may determine keywords and/or context of a wireless communication using the machine learning algorithm 15, which performs an analysis to make the determination without developer-defined hard-coded instructions. Instead, machine learning relies on patterns and inferences. The keywords and/or context may be used to determine fraud detection rules 24, which may facilitate determining which particular application and/or service of the fraud detection verification services 20 to review for user activity and/or third party data, and/or determining whether the wireless communication is fraudulent (by the fraud detection service 22 of the client device 12).

Moreover, the machine learning algorithm 15 may be communicatively coupled to a training data set 18 in order to make predictions. The training data set 18 may include previously recorded wireless communications, their associated keywords, and corresponding fraud detection rules 24. The training data set 18 may also indicate whether the keywords resulted in a fraudulent determination. That is, the training data set 18 may be used to predict and indicate a likelihood of fraud for keywords and/or combinations of keywords of the recorded wireless communications. The keywords and/or combinations of keywords may also indicate the particular application and/or service of the fraud detection verification services 20 to access and review.

The amount of data for the training data set 18 may include at least one wireless communication for each type of possible wireless communication topics (e.g., bank fraud, purchase fraud, credit card fraud, service fraud, signature fraud, etc.) in a library of wireless communications, but most likely will include a sufficient number of wireless communications with associated keywords or combination of keywords (e.g., a question requesting full social security of the user) that indicate fraud to enable the machine learning algorithm 15 to discern wireless communication patterns that resulted in the determination of fraudulent activity. In this manner, rules do not need to be hard coded into the system 10. This may lead to more flexibility, as fraudulent sources oftentimes do not express the wireless communication topics and/or subtopics using rigid verbal constructs.

To facilitate determining the keywords and/or combinations of keywords for the fraud detection rules 24, the fraud detection service server 14 may use the training data set 18 to train the machine learning algorithm 15. During this training phase, the machine learning algorithm 15 may use mathematical and/or statistical models to identify patterns and/or thresholds in the training data set 18 that associated particular keywords and/or combinations of words in the wireless communication that resulted in providing the particular fraud detection rules 24. Furthermore, the machine learning algorithm 15 may classify the identified patterns in the wireless communication to determine the keywords and/or combination of keywords in the particular communication topic to determine the corresponding fraud detection rules 24. Thus, upon receiving new data of the ongoing wireless communication, the machine learning algorithm 15 may classify the wireless communication, determine the keywords and/or combinations of keywords indicating fraud for the particular topic, and output a prediction of the fraud detection rules 24 for the particular wireless communication.

The fraud detection service server 14 may receive the audio and/or display data from the one or more sensors 32 of the client device 12 to determine the keywords and/or context of the wireless communication. In particular, the fraud detection service server 14 may include a speech and/or voice recognition algorithm (not shown) to facilitate determining the keywords spoken during the wireless communication. The keywords and/or combination of keywords may indicate the context of the wireless communication. Moreover, the context may be used to narrow the range of applications and/or services to review from the fraud detection verification services 20. Additionally or alternatively to the speech and/or voice recognition algorithm, the fraud detection service server 14 may also include an image and/or word recognition algorithm (not shown) to determine key images and/or keywords displayed in the wireless communication when the communication includes graphic images or words (e.g., text, email, and/or online chat). The key images and/or keywords may be used to determine the context of the wireless communication.

The server processor 28 may use the machine learning algorithm 15, data from the one or more sensors 32, and/or data stored in the server memory 26 and/or a third party database, to determine and provide the fraud detection rules 24 to the fraud detection service 22. The fraud detection rules 24 may indicate the context of the wireless communication and/or provide an indication of which application and/or service of the fraud detection verification service 20 to review. Moreover, the fraud detection rules 24 may further indicate a score for fraud likelihood based on the determined context, associated remedial actions based on the score, and/or a threshold associated with the remedial actions.

The server processor 28 may include any type of processing circuitry, such as one or more processors, one or more "general-purpose" microprocessors, one or more special-purpose microprocessors, and/or one or more application specific integrated circuits (ASICS), or some combination thereof. For example, the server processor 28 may include one or more reduced instruction set (RISC) processors.

The server memory 26 may be configured to store instructions, data, and/or information for determining the fraud detection rules 24. In some embodiments, the server memory 26 may store the machine learning algorithm 15. The server memory 26 may also store a library of wireless communications (e.g., phone calls, texts, emails, online chat, dialog box on browser, etc., their corresponding fraud detection rules 24, and/or their corresponding fraud determination). In some embodiments, the wireless communications may be tagged or include metadata indicating their associated fraud detection rules 24 and/or corresponding fraud determination. The server memory 26 may be a tangible, non-transitory, computer-readable medium that stores the instructions executable by the server processor 28. Thus, in some embodiments, the server memory 26 may include random access memory (RAM), read only memory (ROM), rewritable non-volatile memory, flash memory, hard drives, optical discs, and the like.

Furthermore, the client device 12 may include a client device memory 34 and a client device processor 36 that operate similarly to the server memory 26 and the server processor 28 of the fraud detection service server 14. The client device memory 34 may be configured to store instructions, data, and/or information for determining whether the wireless communication is from a fraudulent source or a trusted source. The client device processor 36 may process the instructions, data, and/or information stored in the client device memory 34 to determine whether the wireless communication is from a fraudulent source or a trusted source.

Figure 2:
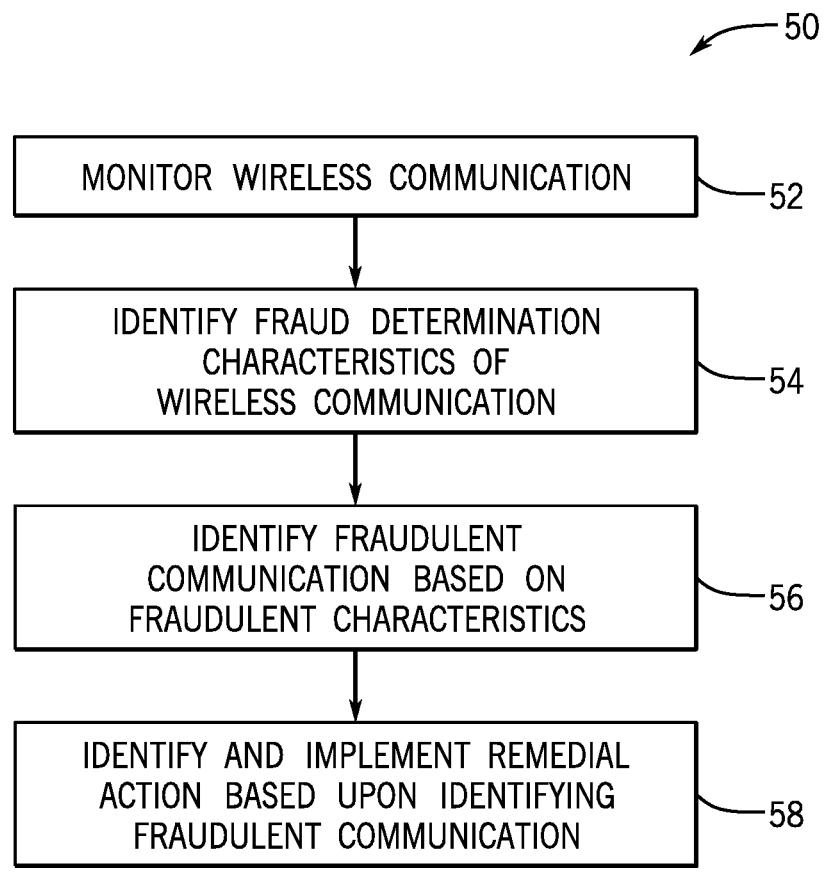
FIG. 2 illustrates a flow chart of a process for identifying a fraudulent communication, in accordance with embodiments described herein.

To illustrate the process for determining whether the wireless communication is from a fraudulent source or a trusted source, FIG. 2 depicts a flow chart of a process 50 for identifying a fraudulent communication. It should be noted that although the process 50 is described below in a particular order, it should be understood that the process 50 may be performed in any suitable order. Moreover, the process 50 and steps of FIG. 2 may be implemented at least in part by executing instructions stored in a tangible, non-transitory, computer-readable medium, such as the client device memory 34 of the client device 12, using processing circuitry, such as the client device processor 36 the client device 12. Accordingly, the process and steps of may be generally performed or controlled by the client device 12.

With the preceding in mind, FIG. 2 depicts the process 50 beginning with the client device 12 monitoring (block 52) the wireless communication. As soon as the client device 12 is connected to the source communication device 16, such as by a telephonic connection, the client device 12 may begin monitoring the wireless communication (e.g., ongoing conversation). Similar monitoring may occur for other forms of wireless communication, such as emails, texts, online chat, and so forth.

Next, the client device 12 may identify (block 54) fraud determination characteristics of the wireless communication. For example, and as previously discussed, the audio and/or display associated with the wireless communication may be communicated to the fraud detection service server 14 of FIG. 1 that may process the information and determine fraud detection rules 24. Using the machine learning algorithm 15 techniques previously described (e.g., determining patterns using historical data to identify similar patterns for ongoing wireless communication), the fraud detection rules 24 may indicate the keywords and/or combination of keywords, which may indicate the context and the particular topic (e.g., call type) of the wireless communication.

The client device 12 may process the fraud detection rules 24 to identify the fraudulent determination characteristics. For example, the characteristics may include the keywords and/or combination of keywords, context and topic of wireless communication, and/or fraud determination previously associated with such keywords. Based on this information, the client device 12 may also determine which specific application and/or service of the fraud detection verification service 20 of FIG. 1 to review. The keywords may indicate a likelihood of fraud and the context in which it is used. By way of example, the keywords may include "credit card fraud," "Bank Account Service 1," "$1000 transaction," a first name and a last name used to address the client, a source telephone number, and so forth. Thus, based on these keywords, the client device 12 may specifically search for the application associated with the Bank Account Service 1. In particular, the client device 12 may be enabled to automatically search through the application's data to determine whether there has been a $1,000 transaction within a predetermined time. Furthermore, the client device 12 may retrieve policy information associated with the Bank Account Service 1, such as by connecting to a servicer or online service. The policy information may indicate the possible source telephone number (e.g., a whitelist of phone numbers) associated with the Bank Account Service 1, the generic or specific credentials used to address the client on a telephone call, etc. In this manner, the client device 12 may use the fraud detection rules 24 for a quick and efficient search path. That is, the client device 12 may reference the applicable application and transactions within the data related to the context of the wireless communication.

Next, the client device 12 may identify (block 56) the fraudulent communication based on the fraudulent characteristics. After the client device 12 reviews relevant information from the particular application and/or service of the fraud detection verification service 20, the client device 12 may use the information to confirm whether the wireless communication is fraudulent. In some embodiments, the wireless communication may be deemed fraudulent based on a threshold confidence. The threshold confidence may be based on a verification of one or more factors corresponding to the fraudulent characteristics. For example, the fraudulent characteristics may include multiple keywords and the client device 12 may review one or more factors (e.g., bank account balance, recent transactions, ability to login, etc. on the particular application) to verify the fraudulent characteristics. The threshold may include a determination of fraud when at least one of the keywords is verified. In some embodiments, the threshold confidence may be determined by the machine learning algorithm 15 of FIG. 1, using the techniques previously described. Continuing with the previously discussed Bank Account Service 1 example, the one or more keywords may include "transaction for $1000" and "credit card account on hold," and the threshold may include verifying that at least one of these keywords may be confirmed. To verify, the client device 12 may access the Bank Account Service 1 application and review multiple factors (e.g., the account balance, the recent transactions, and the ability to login). The application data may indicate that a transaction for $1000 does not exist within the last 24 hours and/or there are no issues or hold on the credit card account. Thus, the client device 12 may identify the wireless communication as fraudulent.

In some embodiments, the client device 12 may review the fraudulent characteristics based on a weight associated with the characteristics. The weight of the fraudulent characteristics may also be determined by the machine learning algorithm 15 using the techniques previously described. By way of example, the transaction of $1000 may be more indicative of whether the wireless communication is fraudulent than the credit card account hold. Thus, the transaction fraudulent characteristic may have a greater weight associated with it than the credit card hold fraudulent characteristic. As such, the client device 12 may still determine that the wireless communication is fraudulent when the transaction for $1000 does not exist within the last 24 hours but there is a credit card account hold. As such, the client device 12 may determine that the wireless communication from source communication device 16 is a fraudulent communication.

After identifying the wireless communication as a fraudulent communication, the client device 12 may identify (block 58) and implement a remedial action based upon identifying the fraudulent communication. Depending on the fraudulent activity determined, the client device 12 may provide an automatic and/or suggested remedial action to the GUI of the client device 12. Since the client device 12 may efficiently determine the application and/or service to review based on the fraudulent characteristics, providing the remedial action may occur immediately or soon after the wireless communication from the source communication device 16. As such, the remedial action may be provided prior to the user conveying sensitive information during the wireless communication.

Figure 3:
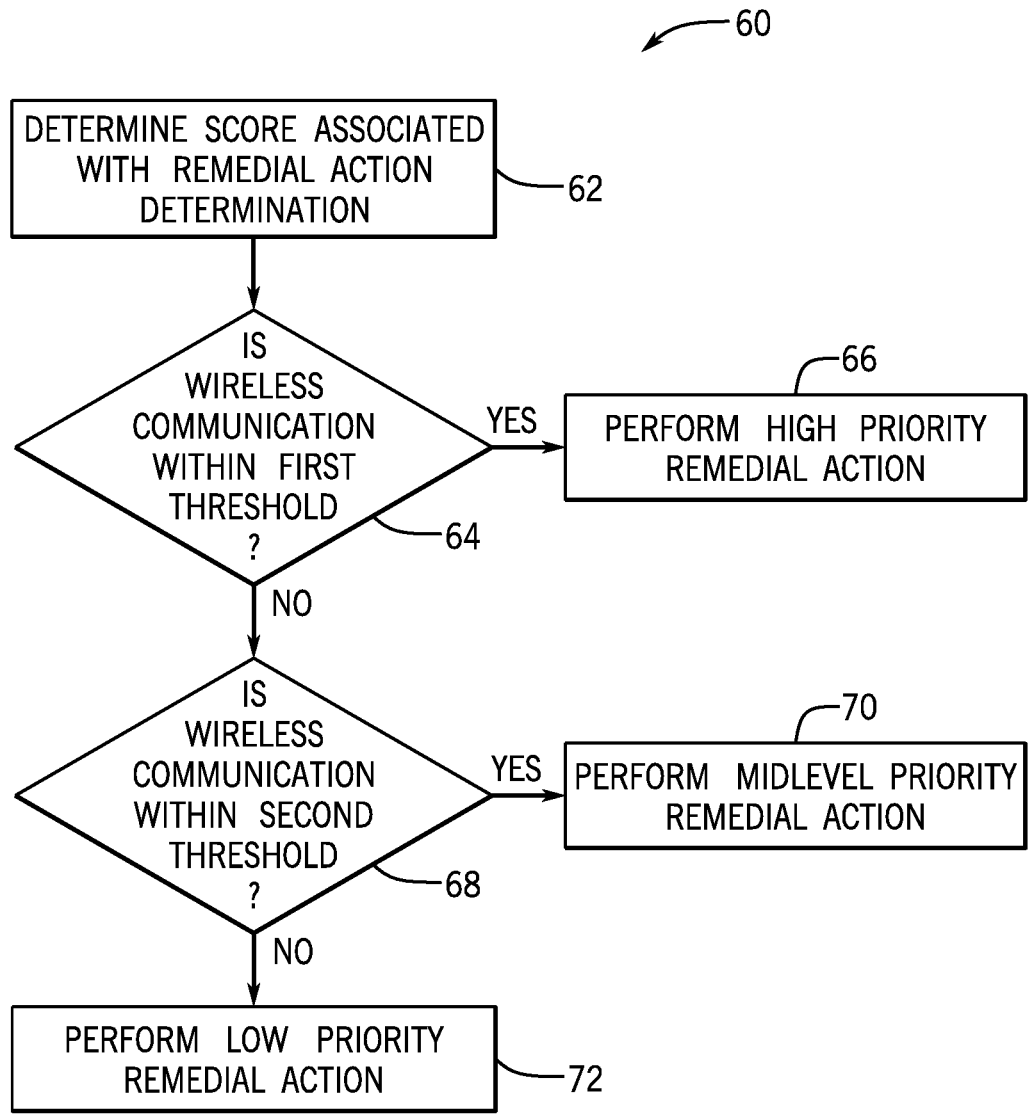
FIG. 3 illustrates a flow chart of a process for identifying a remedial action, in accordance with embodiments described herein.

To illustrate the remedial action provided by the client device 12, FIG. 3 depicts a flow chart of the process 60 for determining the remedial action. The process 60 may being with the client device 12 determining (block 62) a score associated with the remedial action determination. That is, based on the severity of the score associated with identification of the fraudulent communication, a corresponding remedial action may be provided. The score associated with the identification of the fraudulent communication may be determined by the machine learning algorithm 15 and/or the client device 12. Specifically, the machine learning algorithm 15 of FIG. 1 may indicate a score associated with the fraudulent characteristics, such that the score is dynamically adjusted to be higher or lower based on keywords, combination of keywords, and/or topic of the wireless communication. For example, the determination may be made based on historical data of the training data set 18 of FIG. 1. The historical data that may indicate a relatively higher susceptibility to fraud and/or greater risk based on particular keywords, combination of keywords, and/or topic of wireless communication. For example, the keywords "provide social security" may be associated with a higher score than the keywords "provide primary email address" since the client providing the social security number may be more detrimental than providing the primarily used email address.

Additionally or alternatively, the score may be determined and/or dynamically adjusted by the client device 12 based on the data from the particular application and/or service reviewed from the fraud detection verification service 20. For example, if the client device 12 verifies that the wireless communication is from a fraudulent source based on multiple factors (e.g., $1000 transaction exists within past 24 hours and credit card account is on hold), then the score may be relatively higher than if the fraudulent source is based on fewer factors (e.g., $1000 transaction exists within past 24 hours).

Although the following discussions describe three thresholds with a single corresponding remedial action, which represents a particular embodiment, the systems and methods described herein may be implemented with fewer or greater (e.g., one, four, or ten) thresholds and/or fewer (e.g., one, four, ten) or greater corresponding remedial actions. The thresholds described herein may be determined by the machine learning algorithm 15 based on the specific keywords, combination of keywords, context of wireless communication, and/or wireless communication topic that may be indicated by the fraud detection rules 24 of FIG. 1. Moreover, the thresholds may be dynamic since these factors are determined based on training data set 18 received by the fraud detection service server 14 of FIG. 1, such that the factor determinations may change as additional training data 18 is received by the fraud detection service server 14.

After determining the score, the client device 12 may determine whether the wireless communication is within a particular threshold based on a level of engagement between the client device 12 and the source communication device 15. In particular, client device 12 may determine whether (decision block 64) the wireless communication is within a first threshold. Since the depicted embodiment includes three thresholds, the first threshold may be the highest threshold associated with the safest remedial action that prevents the fraudulent source from obtaining fraudulent information from the client. Here, the first threshold may include the client device 12 not yet engaging with the source communication device 16. That is, the client device 12 may have either received a request to connect to the source communication device 16 (e.g., receive a phone call) or has connected to the source communication device 16 (e.g., picked up phone call and connected to the source communication device 16) but has not yet responded or engaged in conversation.

If the wireless communication is within the first threshold, then the client device 12 may perform (block 66) a high priority remedial action. The high priority remedial action may be the safest remedy, and as such, may include automatically disconnecting from the wireless communication to prevent any communication between the client device 12 and the source communication device 16.

On the other hand, if the wireless communication is not within the first threshold, then the client device 12 may determine whether (decision block 68) the wireless communication is within a second threshold. The second threshold may be a midlevel threshold, such that the wireless communication may involve the client device 12 engaging with the source communication device 16 (e.g., client engaging in a conversation with a fraudulent representative). However, at this point, the client has not provided sensitive information and/or the information requested by the fraudulent representative. For example, the client may provide the fraudulent representative with generic information (e.g., the date, time, requested additional information, etc.)

If the wireless communication is within the second threshold, then the client device 12 may perform (block 70) a midlevel priority remedial action. For example, since the client has already engaged in some conversation, the remedial action may be to provide a disruptive alert to the client device 12. For example, the disruptive alert may include a sound and/or a digital assistant interrupting the conversation to indicate that the wireless communication may a fraudulent communication. The interruption may include a digital voice providing a recommendation to the client. The recommendation may include a recommendation that the client device 12 end the wireless communication. In embodiments that involve a display for the wireless communications, such as text, email, and/or online chat, the digital assistant may provide a popup dialog box on the display to provide the recommendation.

However, if the wireless communication is not within the second threshold, then the client device 12 may perform (block 72) a low priority remedial action. If the client has already engaged in conversation and provided sensitive information, then the client device 12 may perform mitigating actions rather than preventative actions. By way of example, the low priority remedial action may include the client device 12 sending a text notification to the GUI of the client device 12 and/or email notification to an email account associated with the client device 12.

Figure 4:
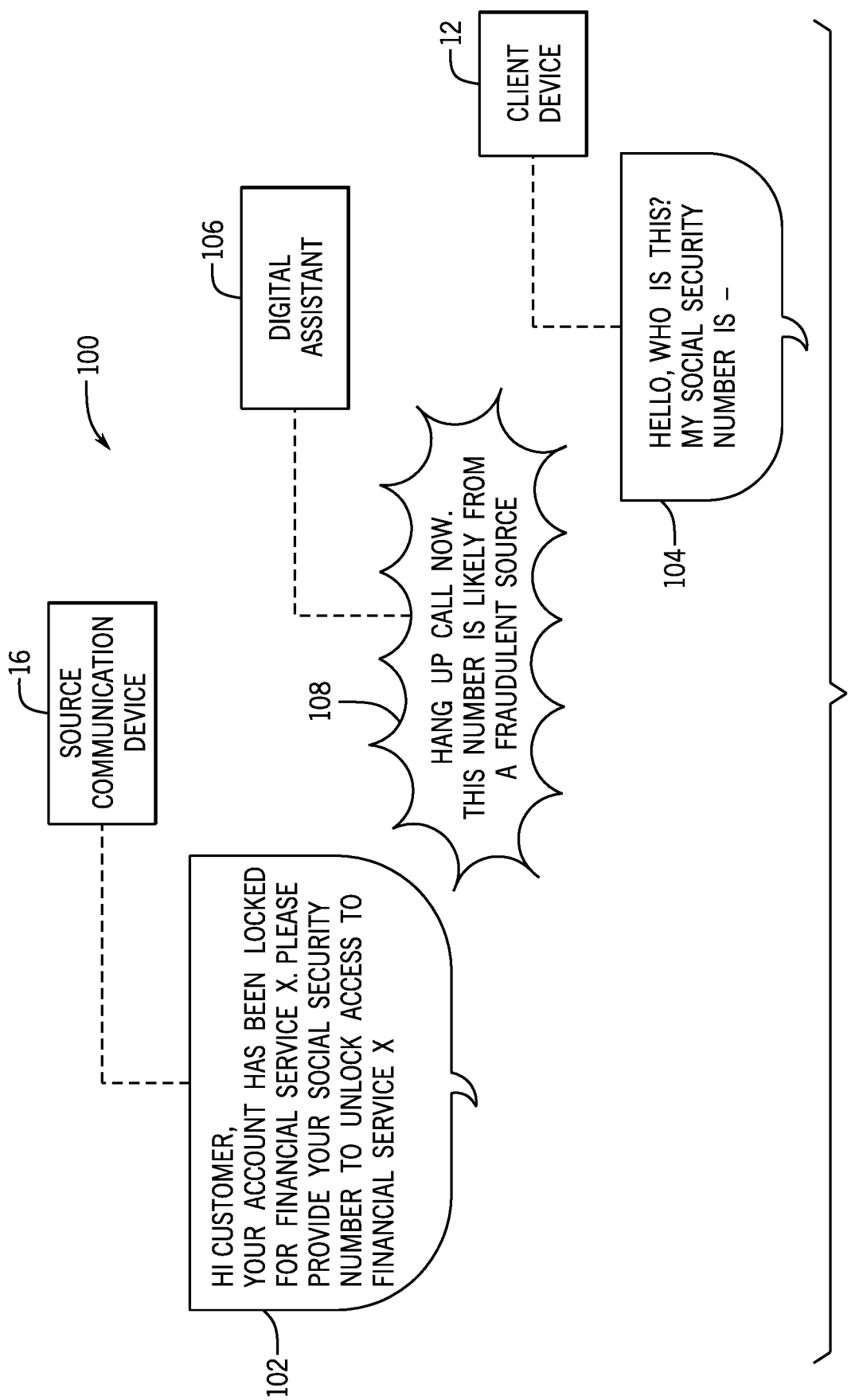
FIG. 4 illustrates a block diagram of a fraudulent wireless communication regarding a financial service application, in accordance with embodiments described herein.

To illustrate an example embodiment of the client device 12 in which fraud detection and remedial actions may be implemented, FIG. 4 depicts a block diagram 100 of a fraudulent wireless communication regarding a financial service application. As shown, the wireless communication may involve the source communication device 16 initiating conversation with the client device 12, as represented by a first dialog box 102. The first dialog box 102 may be populated with words corresponding to the audio of the ongoing wireless communication from the source communication device 16 to the client device 12. In some embodiments, the wireless communication may include other types of conversation, such as text and/or images communicated via email, text, and/or chat messages.

As shown, the first dialog box 102 may represent audio referring to the particular client associated with the client device 12 as a "customer" (or other generic title) indicating that Financial Service X (e.g., application used to access Financial Service X) has been locked, and requesting the client's social security number to unlock access to the Financial Service X. The client may engage in conversation, as represented by a second dialog box 104. The second dialog box 104 may include audio indicating that the client is requesting additional information and starting to provide the social security number.

As previously mentioned, the fraud detection service 22 of the client device 12 may execute in the background (e.g., not at the GUI of the client device 12) while other activities occur on or in communication with the client device 12. Thus, after the source communication device 16 communicates with the client device 12, the fraud detection service 22 may determine whether the wireless communication is fraudulent using the techniques described herein. Specifically, the fraud detection service 22 may communicate with the Financial Service X application on the client device 12. This communication may indicate that the application is secure and remains unlocked. Furthermore, the fraud detection service 22 may communicate with the third party database associated with the Financial Service X to receive associated policy information. The policy information may indicate that the client may be referred to by the client's first, middle (if applicable), and last name. The policy information may also indicate Financial Service X will call send a text indication prior to calling the client. In some embodiments, the policy information may also indicate that the service representative of the Financial Service X is to provide a password and/or passphrase to the client, which may be selected or created by the client (e.g., through the client's online account with the Financial Service X and/or during a wireless and/or in-person communication with a service representative that is initiated by the client). Based on this information, the fraud detection service 22 of the client device 12 may determine that the wireless communication is fraudulent. That is, the fraud detection service 22 may determine that the wireless communication is fraudulent if the fraud detection service 22 identifies that one or more of the policy criteria (e.g., referring to the client by the client's full name, sending a text indication to the client prior to calling the client, and/or providing the password and/or passphrase to the client) has not been met. Upon a determination that the wireless communication is fraudulent, the client device 12 may perform a remedial action.

Here, the wireless communication may involve the client device 12 engaging with the source communication device 16 but not providing the sensitive information. As such, the wireless communication may be within the second threshold of FIG. 3. Thus, the client device 12 may perform the corresponding midlevel priority remedial action. Accordingly, a digital assistant 106 of the client device 12 may interrupt the ongoing conversation of the wireless communication. As the client starts giving the social security number (or other sensitive and/or identifying information), the digital assistant 106 may interrupt with a sound alert, and/or a voice alert and/or recommendation. An interrupt dialog box 108, which represents the audio or sound alert of the digital assistant 106, may indicate the remedial recommendation provided by the client device 12. For example, the digital assistant 106 may recommend hanging up on the source communication device 16 and an indication that the number associated with the source communication device 16 is likely from a fraudulent source. In some embodiments, the midlevel priority remedial action may block or prevent further wireless communication with the determined fraudulent source. For example, the digital assistant 106 may disconnect the wireless communication and/or may provide a sound and/or image to alter, block, and/or interfere with the wireless communication (e.g., voice, text, etc.) from the client to the determined fraudulent source such that the fraudulent source may be unable or less likely to ascertain the social security number (or other sensitive and/or identifying information) from the client. Using the techniques described herein, the client device 12 may determine whether incoming and/or ongoing wireless communication is fraudulent in an accurate and efficient manner. Furthermore, the client device 12 may perform preventative and/or mitigating recommendations in an accurate and efficient manner.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A fraud detection system, comprising:
a client device associated with a client comprising a customer of a service, wherein the client device comprises:
a memory configured to store instructions; and
a processor configured to execute the instructions, wherein the instructions, when executed by the processor, cause the client device to:
receive an indication of a wireless communication initiated from a source communication device associated with a source to the client device, the source providing an indication that it represents the service, wherein the wireless communication comprises a conversation via a phone call, a text, an email, an online chat message, or a combination thereof;
monitor the wireless communication between the client device and the source communication device to identify a keyword, a combination of keywords, a context, a topic, or a combination thereof, of the wireless communication comprising a status representation regarding the service that is made by the source;
poll one or more applications executing on the client device that is associated with the service, one or more third party information sources related to the one or more applications but different than the source and the client, or a combination thereof for information corresponding to the status representation;
identify fraudulent detection characteristics of the wireless communication based at least in part of the keyword, the combination of keywords, the context, the topic, or a combination thereof, wherein the fraudulent detection characteristics comprise a match indication of status indicating a level of match in comparison of the status representation and the information corresponding to the status representation;
identify a level of confidence that the wireless communication is a fraudulent communication based on the fraudulent detection characteristics;
identify a remedial action from a set of two or more remedial actions based at least in part on the level of confidence being within a particular confidence threshold range, wherein the remedial action is identified as a first remedial action when the level of confidence is within a first confidence threshold range and the remedial action is identified as a second remedial action different than the first remedial action when the level of confidence is within a second confidence threshold range, wherein the remedial action comprises at least one of: rendering a sound alert, a voice interrupt during the conversation, a text alert on a graphical user interface (GUI) of the client device, disconnecting the wireless communication, or a combination thereof; and
implement the remedial action.

2. The fraud detection system of claim 1, comprising a fraud detection service server; wherein identifying the wireless communication as the fraudulent communication is based on a machine learning algorithm of the fraud detection service server, wherein the fraud detection service server is communicatively coupled to the client device.

3. The fraud detection system of claim 2, wherein the machine learning algorithm determines a pattern, a threshold, or a combination thereof, to identify the keyword, the combination of keywords, the context, the topic, or a combination thereof, associated with wireless communication.

4. The fraud detection system of claim 1, wherein the client device, the source communication device, a fraud detection service server communicatively coupled to the client device, or a combination thereof, are connected to a common network.

5. The fraud detection system of claim 1, wherein identifying the fraudulent detection characteristics is performed by a fraud detection service of the client device, wherein the fraud detection service is configured to execute in a background of the client device.

6. The fraud detection system of claim 1, wherein the client device comprises one or more audio sensors to detect audio of the wireless communication, one or more display sensors to detect a display associated with the client device, or a combination thereof.

7. The fraud detection system of claim 1, wherein the polling of the one or more applications executing on the client device, one or more third party information sources related to the one or more applications, or a combination thereof comprises: identifying the one or more applications from a plurality of applications, based upon the one or more applications being associated with the service.

8. The fraud detection system of claim 7, wherein the polling of the one or more applications, the one or more third party information sources, or a combination thereof, comprises retrieving data from the client device that is stored on the client device via the one or more applications, retrieving the data from a device external to the client device via the one or more applications, or a combination thereof.

9. A method, comprising:
monitoring, via a client device associated with a client comprising a customer of a service, a conversation of a communication session between the client device and a source communication device associated with a source that initiated the communication session with the client device, the source providing an indication that it represents the service, wherein the communication session comprises a conversation via a phone call, a text, an email, an online chat message, or a combination thereof;
identifying, via the client device, a keyword, a combination of keywords, a context, a topic, or a combination thereof, of the conversation comprising a status representation regarding the service that is made by the source, using a machine learning algorithm;
polling one or more applications executing on the client device that is associated with the service, one or more third party information sources related to the one or more applications but different than the source and the client, or a combination thereof for information corresponding to the status representation;
identifying, via the client device, fraudulent detection characteristics of the conversation based at least in part on the keyword, the combination of keywords, the context, the topic, or a combination thereof, wherein the fraudulent detection characteristics comprise a match indication of status indicating a level of match in comparison of the status representation and the information corresponding to the status representation;
identifying, via the client device, a level of confidence that the conversation is a fraudulent communication based on the fraudulent detection characteristics; and
identifying and implementing, via the client device, a remedial action based at least in part on the level of confidence being within a particular confidence threshold range, wherein the remedial action is identified as a first remedial action when the level of confidence is within a first confidence threshold range and the remedial action is identified as a second remedial action different than the first remedial action when the level of confidence is within a second confidence threshold range, wherein the remedial action comprises at least one of: rendering a sound alert, a voice interrupt during the conversation, a text alert on a graphical user interface (GUI) of the client device, disconnecting the communication session, or a combination thereof.

10. The method of claim 9, wherein the keyword, the combination of keywords, the context, the topic, or a combination thereof, are associated with a weight.

11. The method of claim 10, wherein a greater weight associated with the keyword, the combination of keywords, the context, the topic, or a combination thereof, indicates a greater likelihood of fraud in comparison to a lower weight associated with the keyword, the combination of keywords, the context, the topic, or a combination thereof.

12. The method of claim 9, wherein the keyword, the combination of keywords, the context, the topic, or a combination thereof, are used to determine a fraud detection rule.

13. The method of claim 9, wherein the level of confidence is based at least in part on a level of engagement between the client device and the source communication device.

14. The method of claim 13, wherein the level of confidence threshold corresponds to a priority level of the remedial action.

15. The method of claim 14, wherein the priority level includes a first priority level associated with an action that prevents the source communication device from obtaining sensitive information from the client device, wherein the priority level comprises a second priority level associated with another action that mitigates the source communication device from obtaining additional sensitive information, and wherein the first priority level comprises a higher priority than the second priority level.

16. A tangible, non-transitory, computer-readable medium of a client device storing instructions executable by one or more processors of the client device, wherein the instructions, when executed, are configured to cause the one or more processors of the client device to:
monitor, via the client device, a wireless communication between the client device and a source communication device in a fraud detection system, wherein the wireless communication is initiated by the source communication device to the client device, the wireless communication comprises a conversation via a phone call, a text, an email, an online chat message, or a combination thereof, and wherein the client device is associated with a client comprising a customer of a service and the source communication device is associated with a source providing an indication that it represents the service;
identify, via the client device, a keyword, a combination of keywords, a context, a topic, or a combination thereof, of the wireless communication comprising a status representation regarding the service that is made by the source, using a machine learning algorithm;
poll one or more applications executing on the client device that is associated with the service, one or more third party information sources related to the one or more applications but different than the source and the client, or a combination thereof for information corresponding to the status representation;
identify, via the client device, fraudulent detection characteristics of the wireless communication based at least in part on the keyword, the combination of keywords, the context, the topic, or a combination thereof, wherein the fraudulent detection characteristics comprise a match indication of status indicating a level of match in comparison of the status representation and the information corresponding to the status representation;

identify, via the client device, a level of confidence that the wireless communication is a fraudulent communication based on the fraudulent detection characteristics; and identify and implement, via the client device, an automatic remedial action, wherein the automatic remedial action is identified as a first remedial action when the level of confidence is within a first confidence threshold range and the automatic remedial action is identified as a second remedial action different than the first remedial action when the level of confidence is within a second confidence threshold range, wherein the remedial action comprises at least one of: rendering a sound alert, a voice interrupt during the conversation, a text alert on a graphical user interface (GUI) of the client device, disconnecting the wireless communication, or a combination thereof.

17. The tangible, non-transitory, computer-readable medium of claim 16, wherein the automatic remedial action is implemented based upon characteristics of an initial conversation of the wireless communication provided from the source communication device independent of a response from the client device.

* * * * *